United States Patent
Bonder et al.

[11] Patent Number: 5,957,087
[45] Date of Patent: Sep. 28, 1999

[54] BIRD FEEDER WITH A REMOVABLE FEED DRAWER

[76] Inventors: Carol P. Bonder; Murray Bonder, both of 104 Elmview Dr., Apex, N.C. 27502

[21] Appl. No.: 09/093,024

[22] Filed: Jun. 8, 1998

[51] Int. Cl.⁶ .................................................. A01K 31/00
[52] U.S. Cl. ........................ 119/429; 119/432; 119/462; 119/57.8
[58] Field of Search ................... 119/428, 429, 119/431, 432, 462, 51.01, 52.2, 52.3, 57.8, 57.9, 464, 452, 454, 456, 475, 463

[56] References Cited

U.S. PATENT DOCUMENTS

| | | | |
|---|---|---|---|
| 38,177 | 1/1863 | Osborn | 119/462 |
| D. 191,518 | 10/1961 | Olson | D30/124 |
| D. 227,270 | 6/1973 | Onos | D30/126 |
| 2,184,633 | 12/1939 | Copeman | 119/57.8 |
| 2,738,763 | 3/1956 | Bowes | 119/463 |
| 2,769,426 | 11/1956 | Bromley | 119/462 |
| 2,845,896 | 8/1958 | Copeland | 119/51.01 |
| 2,914,022 | 11/1959 | Hinton | 119/463 |
| 3,100,474 | 8/1963 | Schneider | 119/166 |
| 3,151,600 | 10/1964 | Crouch et al. | 119/57.8 |
| 4,586,463 | 5/1986 | Braeuner | 119/462 |
| 5,152,247 | 10/1992 | Brown | 119/464 |
| 5,479,880 | 1/1996 | Stuhr et al. | 119/57.8 |
| 5,826,539 | 10/1998 | Bloedorn | 119/52.2 |

*Primary Examiner*—Michael J. Carone
*Assistant Examiner*—James S. Bergin
*Attorney, Agent, or Firm*—Rhodes, Coats & Bennett, LLP

[57] ABSTRACT

The present invention relates to a bird feeder having a bottom structure, a roof structure, and a side support structure extending between the bottom and roof structures. Disposed within the bird feeder is a sliding feed drawer. The sliding feed drawer normally assumes a position within the bird feeder. However the entire feed drawer can be removed from the bird feeder for easy and convenient cleaning.

18 Claims, 3 Drawing Sheets

BIRD FEEDER WITH A REMOVABLE FEED DRAWER

FIELD OF THE INVENTION

The present invention relates to bird feeders, and more particularly to means for containing and holding bird feed within the bird feeder.

BACKGROUND OF THE INVENTION

Bird feeders have for many years been popular with many people including bird watchers, homeowners, and people in general that have a love for birds. There are, of course, many different types of bird feeders. One type of bird feeder that is quite common is the birdhouse type. These bird feeders generally include a feed area that receives and holds birdfeed. While these bird feeders do attract birds and provide an effective setting for watching birds, they typically have one major drawback or shortcoming. They are difficult and messy to clean. This is because the bird feeding area is fixed within the birdhouse or bird feeding structure. To clean the feeding area requires one to deal with the entire bird feeder and that is often cumbersome and awkward, not to mention the pure difficulty of cleaning a feed holding area that is sometimes encased within a birdhouse or bird feeding structure.

Therefore, there has and continues to be a need for a bird feeder that includes a feed holding area that is easily accessible and which can be cleaned quickly and efficiently.

SUMMARY OF THE INVENTION

The present invention entails a bird feeder that includes a bottom frame, a roof structure, and a side support structure extending upwardly between the bottom frame and the roof structure. Contained within the bird feeder is a removable feed drawer that is slideable back and forth within the bird feeder.

In one particular embodiment, the bird feeder assumes a fly-through type construction. Here the bird feeder includes a bottom frame and a series of corner posts extending vertically upwardly from the bottom frame. A roof structure is supported by the corner posts. Between the corner posts and the bottom and roof structures, there is preformed a series of open areas that permit birds to fly into and through the open sides of the bird feeder. In this embodiment, the removable drawer includes a bottom screen that supports and holds the bird feed which allows air to pass through the bottom screen.

It is therefore an object of the present invention to provide a bird feeder that is easily cleaned.

Another object of the present invention is to provide a bird feeder that includes a removable feed drawer.

Still a further object of the present invention is to provide a bird feeder of the character referred to above that is of an open construction that enables birds to fly into and through the bird feeder.

Other objects and advantages of the present invention will become apparent and obvious from a study of the following description and the accompanying drawings, which are merely illustrative of such invention.

BRIEF DESCRIPTIONS OF THE DRAWINGS

DETAILED DESCRIPTION OF THE INVENTION

Figure 1:
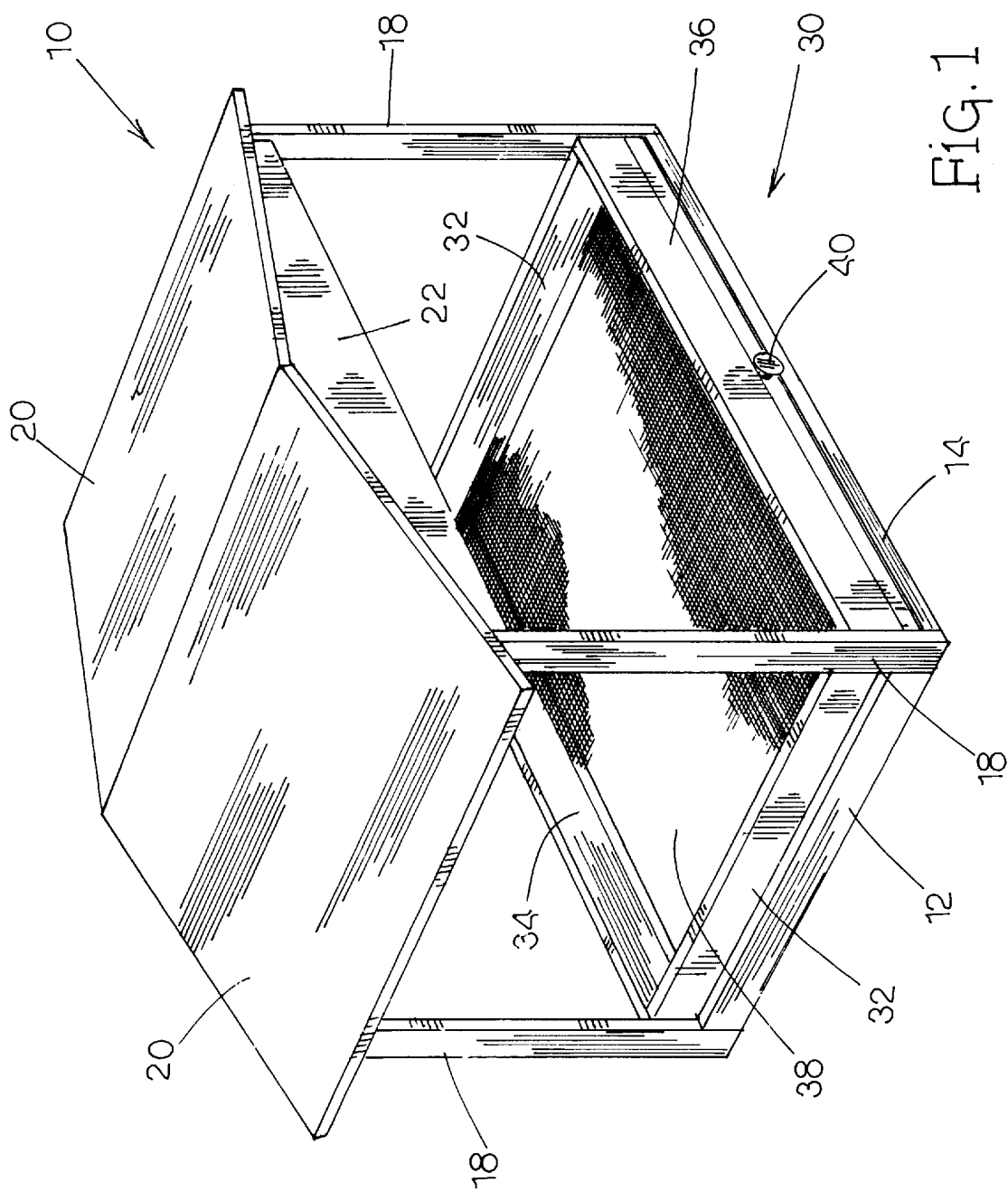
FIG. 1 is a perspective view of the bird feeder of the present invention.

With further reference to the drawings, the bird feeder of the present invention is shown therein and indicated generally by the numeral 10. Bird feeder 10 includes a bottom frame structure that includes a pair of laterally spaced perimeter members 12 and a series of spaced apart slats 14 that extend between and which are connected to the perimeter members 12. A pair of slide rails 16 are formed on the slats 14 adjacent the perimeter members 12. Slides 16 are relatively slick and as will be appreciated from subsequent portions of the disclosure underlie a feed drawer that is designed to be moved back and forth over the bottom frame.

Extending upwardly from the bottom frame is a series of corner posts 18. Note that each corner post is secured to the bottom frame such that respective corner posts align with a respective perimeter member 12 of the bottom frame. In addition the corner posts 18 are connected to the bottom frame such that each of the corner posts 18 assume an indented position within the respective four corners of the bottom frame.

The corner posts 18 function to support a roof structure over the bottom frame. In the embodiment illustrated herein, the roof structure includes a pair of roof panels 20 and a front and rear gable 22. Note that each gable 22 is connected between upper portions of two corner posts 18 and further each gable 22 abuts against and supports the roof structure and particularly the two roof panels 20 that form the roof structure. The respective roof panels 20 can be secured to the gables 22 in various ways. For example, the roof panels 20 can be glued to the gables 22 or the roof structure can be secure to the gables 22 via screws.

Therefore, it is appreciated that a series of open areas are defined around the bird feeder 10. In the case of the embodiment shown in FIGS. 1–3, the only support structure formed about the side of the bird feeder 10 are the series of corner posts 18. As such, the open sides are defined between the respective corner posts 18 and the bottom frame structure and the upper roof structure. This permits birds to fly into and through the bird feeder 10.

Mounted within the bird feeder 10 is a removable feed drawer, indicated generally by the numeral 30. Removable feed drawer 30 includes a pair of sides 32, a back 34, and a front 36. The sides 32, back 34 and front 36 of the feed drawer form a generally rectangular frame that supports a screen 38. Screen 38 forms the bottom of the removable feed drawer.

A pull 40 is secured to the front 36 of the drawer and a stop 42 is secured about the backside of the bottom frame so as to limit the rearward movement of the feed drawer 30 when the same is confined within the bird feeder 10.

It is appreciated that the screen 38 can be mounted within the frame structure of the feed drawer 30 in various ways. However, in one design, the basic rectangular frame, that is the sides 32, back 34 and front 36 of the drawer, are of a two-part construction in that each includes an upper member and a lower member, and the screen 38 is effectively sandwiched between the pair of members that make up the components of the drawer frame.

Figure 2:
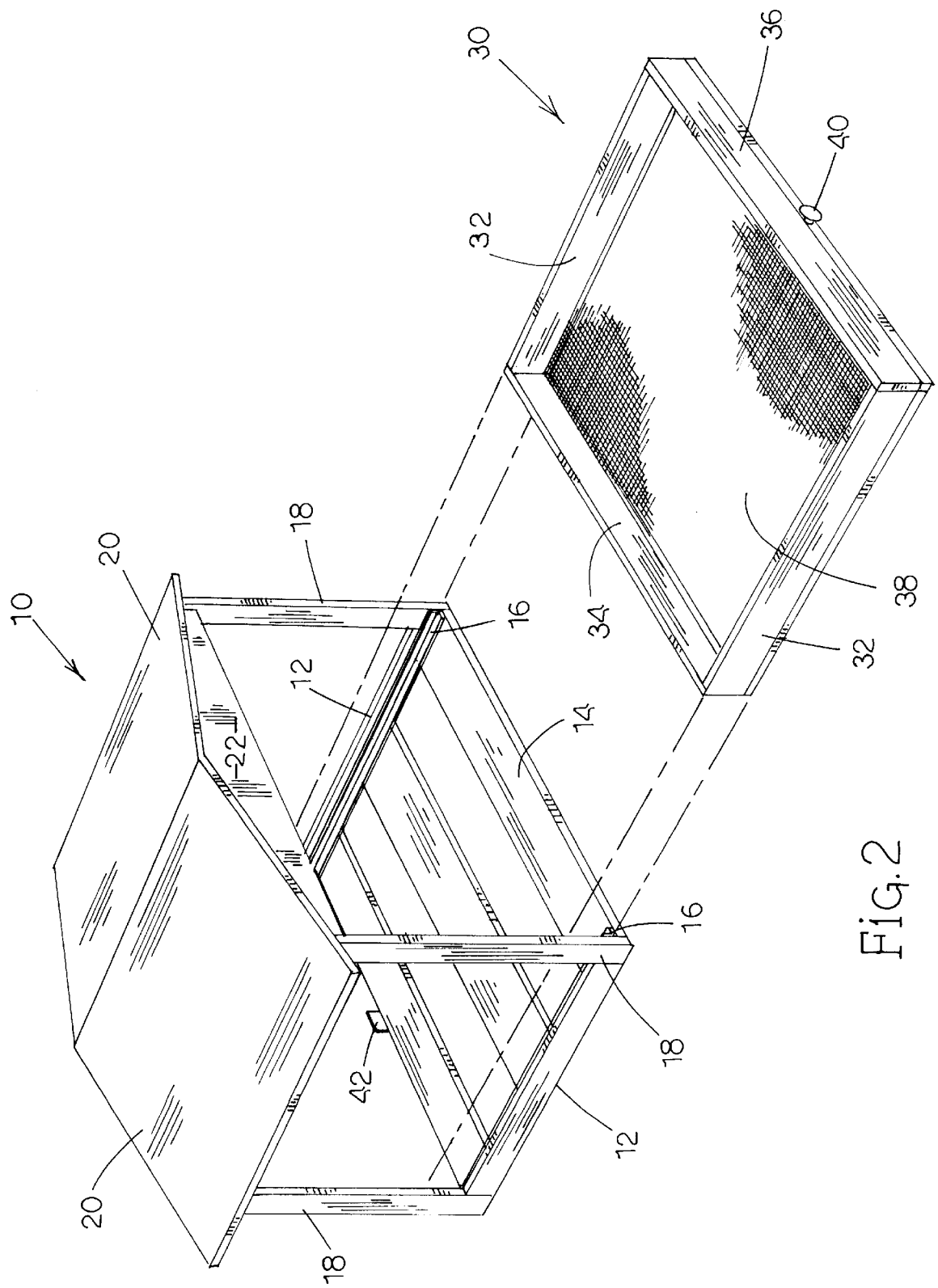
FIG. 2 is a perspective view of the bird feeder of the present invention showing the removable drawer pulled from the bird feeder.

Thus, it is appreciated that the removable feed drawer 30 can assume a normal position in the bird feeder 10 as shown in FIG. 2. However, the same removable drawer 30 can be removed from the bird feeder 10, as shown in FIG. 2, for the purpose of cleaning or restocking the same with bird feed. Thus, it is appreciated that the feed drawer 30 can be easily and conveniently removed from the bird feeder 10 and cleaned without having to deal with the overall bird feeder 10.

The bird feeder 10 can be located and supported in various positions. For example, the roof structure of the bird feeder can be provided with a supporting structure that would enable the entire bird feeder to be suspended from an area or point above the bird feeder. In addition, the bird feeder 10 can be constructed of various materials including, but not limited to, wood, plastic, metal, etc.

Figure 3:
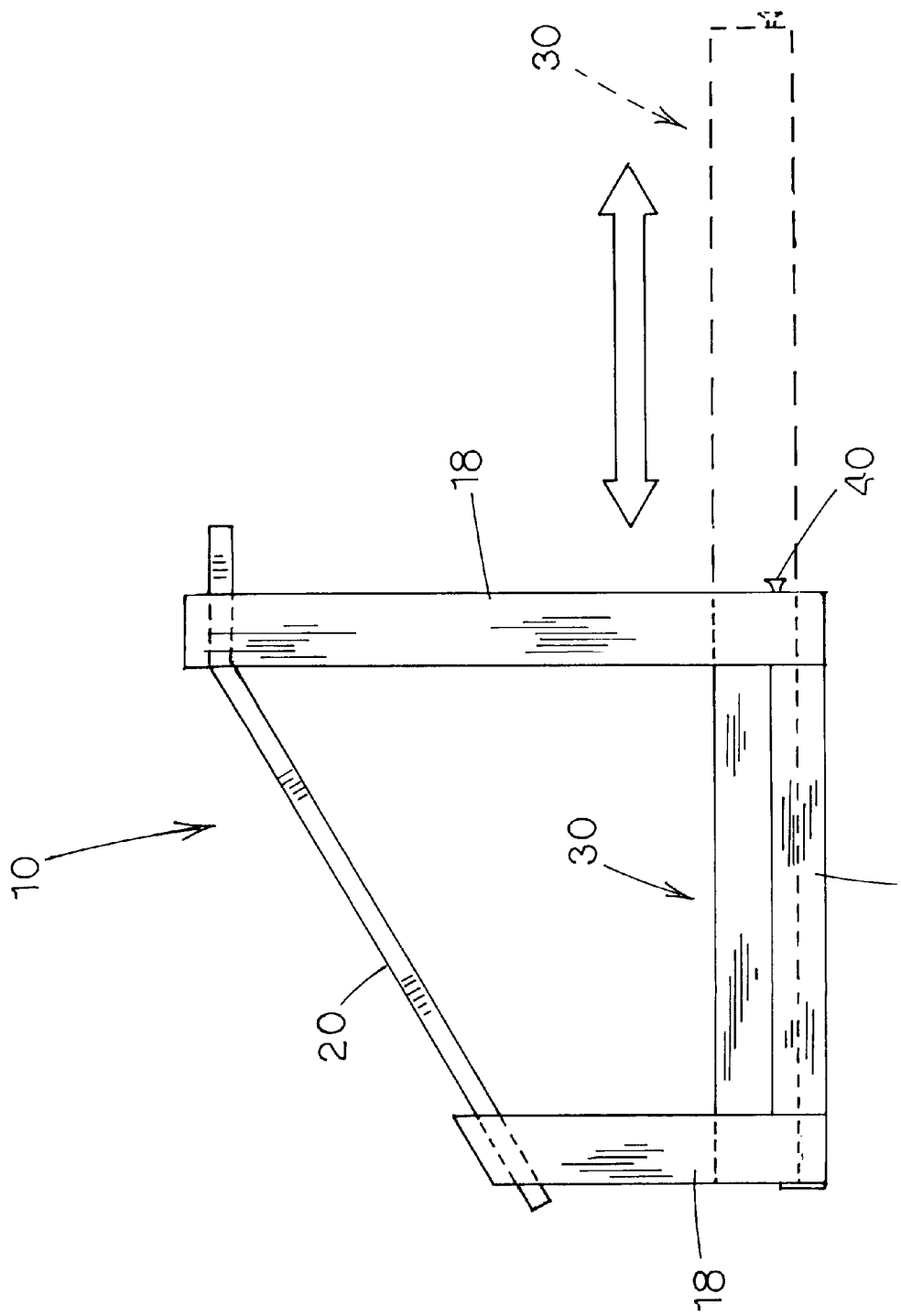
FIG. 3 is a side elevational view of an alternative design for the bird feeder, showing the drawer in a retracted position within the bird feeder (full lines) and in an extended position (dotted lines).

In FIG. 3, there is shown an alternative design for the bird feeder 10. The alternative design is fundamentally similar to the embodiment shown in FIGS. 1 and 2. There are some changes, however, and the changes are basically reflected in the design and shape of the roof. The embodiment shown in FIGS. 1 and 2 is basically an A-frame roof structure. In the alternative design of FIG. 3, the roof structure or panel 20 is inclined upwardly from the back towards the front of the bird feeder 10. Still the bird feeder 10 shown in FIG. 3 includes the removable drawer 30 and the removable drawer 30 in this embodiment works the same as the removable drawer 30 of the first embodiment illustrated in FIGS. 1 and 2.

The present invention may, of course, be carried out in other specific ways than those herein set forth without departing from the spirit and essential characteristics of the invention. The present embodiment is, therefore, to be considered in all respects as illustrative and not restrictive, and all changes coming within the meaning and equivalency range of the appended claims are intended to be embraced therein.

What is claimed is:

1. A bird feeder comprising:
   a) a bottom frame;
   b) a series of corner posts extending vertically upwardly from the bottom frame;
   c) a roof supported by the corner posts;
   d) a series of open side areas formed between the respective corner posts that permits birds to fly through the bird feeder and between the bottom frame and roof;
   e) a removable feed drawer mounted over the bottom frame and slideable back and forth across the bottom frame, and wherein the feed drawer is slideable outwardly from the bird feeder such that it can be cleaned and replenished with feed; and
   f) the removable feed drawer including a bottom screen for retaining bird feed therein.

2. The bird feeder with the removable feed drawer of claim 1 wherein there is provided a pair of laterally spaced slide rails supported by the bottom frame and normally providing a sliding surface for the feed drawer to slide on.

3. The bird feeder with the removable feed drawer of claim 2 wherein the feed drawer includes an upper frame and a lower frame and wherein the bottom screen is sandwiched between the upper and lower frames.

4. The bird feeder with the removable feed drawer of claim 1 including at least a pair of gables, each gable extending between two respective corner posts and disposed adjacent the roof.

5. The bird feeder with the removable feed drawer of claim 4 wherein each gable extends underneath a portion of the roof and wherein the roof is supported in part at least by the underlying gable.

6. The bird feeder with the removable feed drawer of claim 5 wherein the bird feeder includes front and back sides and wherein the gables are disposed on the front and back sides of the bird feeder.

7. The bird feeder with the removable drawer of claim 1 wherein the bird feeder is completely open between the removable feed drawer and the roof structure except for the corner posts extending between the bottom frame and the roof structure.

8. The bird feeder with the removable feed draw of claim 1 wherein the bottom frame includes a series of perimeter members and a bottom structure formed of a series of laterally spaced slats with the respective slats extending between and connected to the perimeter members and wherein there is formed a series of four corner areas around the bottom frame, and wherein the series of corner posts includes four separate corner posts with each corner post having a bottom portion that connects to both one of the perimeter members and to one of the laterally spaced slats so as to form an integral structure between the corner posts, the perimeter members, and the laterally spaced slats; and wherein the roof includes a roof structure that includes at least two angled roof panels supported by a pair of underlying gables connected between the respective support posts, each gable having an upper surface that engages and supports the roof panels and wherein there is provided means for securing the roof panels to the respective gables.

9. The bird feeder with the removable feed drawer of claim 8 wherein the respective support posts retain and confine the feed drawer and maintain the feed drawer generally over the bottom frame of the bird feeder as the feed drawer is moved back and forth therein.

10. The bird feeder having the removable feed drawer of claim 1 wherein the bird feeder includes four separate corner posts and wherein the feed drawer is confined by the four corner posts and wherein the four corner posts retain the feed drawer within the bird feeder when the feed drawer assumes its normal position overlying the bottom frame.

11. The bird feeder having the removable feed drawer of claim 1 wherein the roof includes a roof structure having a single pitch that is inclined upwardly from a back side of the bird feeder towards a front side.

12. A bird feeder with a removable feed drawer comprising:
    a) a bottom structure;
    b) a roof structure disposed over the bottom structure;
    c) a support structure including a series of support posts extending between the bottom and roof structures for supporting the roof structure over the bottom structure;
    d) a sliding and removable feed drawer normally disposed in the bird feeder and supported therein over the bottom structure;
    e) the sliding feed drawer being movable between a normal feeding position where the feed drawer lies within the bird feeder to a retracted position where the feed drawer is no longer confined within the bird feeder such that in the retracted position the feed drawer can be easily and conveniently cleaned;
    f) the removable feed drawer including a screen that forms the bottom of the feed drawer and
    g) a series of open fly through areas defined between the respective support posts.

13. The bird feeder with the removable feed drawer of claim 12 wherein the support posts includes a series of four corner posts.

14. The bird feeder with the removable feed drawer of claim 12 including a pair of slide rails formed on the bottom structure for engaging the sliding feed drawer so as to facilitate the sliding movement of the feed drawer as it is moved back and forth over the bottom structure.

15. The bird feeder with the removable feed drawer of claim 12 wherein the support posts extend outwardly adjacent opposed sides of the removable feed drawer so as to confine and hold the feed drawer within the bird feeder.

16. The bird feeder with the removable feed drawer of claim 15 wherein the respective support posts define a series of open side areas that are formed around the bird feeder and between the bottom and roof structures so as to permit birds to fly through the bird feeder.

17. The bird feeder with the removable feed drawer of claim 12 wherein the feed drawer includes upper and lower drawer frames with the screen being secured and sandwiched between the upper and lower frames.

18. The bird feeder with the removable feed drawer of claim 12 wherein the roof structure includes at least one roof panel and a pair of gables that extend underneath the roof panel and support the roof panel thereover.

* * * * *